3,043,662
Patented July 10, 1962

3,043,662
**METHOD FOR PRODUCING NITROGEN TRIFLUO-
RIDE, DINITROGEN DIFLUORIDE AND NITRO-
SYL FLUORIDE**
Robert D. Lipscomb, Wilmington, Del., assignor to E. I.
du Pont de Nemours and Company, Wilmington, Del.,
a corporation of Delaware
No Drawing. Filed Aug. 20, 1959, Ser. No. 834,938
3 Claims. (Cl. 23—203)

This invention relates to a new process for preparation of inorganic nitrogen/fluorine compounds.

The normally gaseous inorganic nitrogen fluorides, particularly nitrogen trifluoride ($NF_3$), dinitrogen difluoride (difluorodiazine, $N_2F_2$), and nitrosyl fluoride (NOF), are useful in various chemical processes. For example, binary nitrogen fluorides react with carbon at elevated temperatures to produce the highly valuable tetrafluoroethylene as described in U.S. 2,709,186. Similarly, the ternary oxyfluoride of nitrogen (NOF) reacts with carbon under suitable conditions to form tetrafluoroethylene as described in U.S. 2,722,559. Processes for the synthesis of nitrogen/fluorine compounds from readily available materials are therefore highly desirable.

It is an object of this invention to provide a new process for preparing inorganic nitrogen/fluorine compounds. A further object of this invention is to prepare fluorides of nitrogen in a simple manner. A still further object is the synthesis of inorganic nitrogen fluorides starting from certain fluorinated carbon compounds which are readily available. Other objects will appear hereinafter.

These and other objects of this invention are accomplished by the following process which comprises passing a nitrogen oxide and a fluoride of the class consisting of carbon tetrafluoride and carbonyl fluoride through a reaction zone at a temperature of at least 1000° C. in the substantial absence of any other reactive substance such as oxygen or reactive elemental carbon and with a contact time within the hot zone not exceeding 10 seconds, rapidly cooling the gaseous reaction products to a temperature below about 100° C., and obtaining inorganic nitrogen/fluorine compounds.

The starting materials for the process of this invention are the well known carbon tetrafluoride or carbonyl fluoride and the binary oxides of nitrogen, viz., $N_2O$, NO, $N_2O_3$ and $NO_2$, or mixtures thereof. Either or both of the reactants may be diluted or admixed with an inert carrier gas such as nitrogen in order to aid in attaining optimum results. The reaction between the fluoride and the nitrogen oxide may be carried out at atmospheric, subatmospheric or superatmospheric pressure. For practical reasons, subatmospheric pressure in the range of 10 to 300 mm. of mercury is used in the preferred embodiment of the invention. The formation of the nitrogen/fluorine compounds does not take place at a practical rate at temperatures below about 1000° C. which represents the minimum operating temperature. The temperature may be as high as can be attained by practical means such as by means of an electric arc wherein temperatures in the order of 2000–4000° C. or even higher can be achieved.

The molal ratio of reactants, carbon tetrafluoride or carbonyl fluoride to oxides of nitrogen, may vary considerably but is usually within the limits of 5:1 to 1:5 and is preferably kept within the limits of 2:1 to 1:2.

Apparatus of any suitable design constructed of materials that are essentially inert to the reactants or products under the operating conditions may be used to carry out the process of this invention. The reaction zone is within a tube or chamber constructed of high melting glass or other inert materials such as copper, nickel, platinum, tungsten, aluminum, aluminum oxide, or calcium fluoride, which tube or chamber can be packed, if desired, with substantially inert material to improve heat transfer. This reaction zone is heated to a temperature of at least 1000° C. by any suitable means such as a resistance or induction furnace, or an electric arc, and is provided with suitable means for very rapid quenching of the effluent gas and for collecting the product.

A preferred device for carrying out this invention is the electric arc. In this type of equipment, the electrodes must be essentially inert to the reactants and products of this process or, if not inert, they can be arranged in such manner as to be essentially out of contact with the reactants and products or rendered non-consumable by other means such as by cooling. Suitable electrodes may be constructed of carbon, copper, nickel, tungsten, etc. A carbon arc with electrodes rendered non-consumable by cooling is especially preferred. The carbon electrodes are kept cool by supporting them in water-cooled metallic holders. This feature is essential to this invention when carbon electrodes are used because the nitrogen fluorides are either destroyed by reactive elemental carbon as taught by U.S. Patent 2,709,186, or are not formed from $CF_4$ or $COF_2$ and oxides of nitrogen in the presence of reactive elemental carbon as shown following Example VI of this application.

Regardless of the means used to produce the required high temperature, appreciable conversions to nitrogen/fluorine compounds are obtained only if the product emerging from the hot zone is cooled very rapidly (quenched) to a temperature not exceeding about 100° C. The time required to cool the gaseous reaction product, that is, the time of transition from the reaction temperature to a temperature of 100° C. or lower, should not exceed one second. Preferably, it is in the range of 0.001 to 0.1 second. The optimum rate of flow of the gaseous composition through the hot reaction zone depends in large part on this quenching requirement, that is, on the efficiency of the quenching system. Reduced pressures facilitate rapid flow and rapid quenching in any given form of apparatus.

The necessary quenching can be achieved in various ways. For example, the off-gas upon leaving the hot reaction zone can be made to pass over the outside wall of a metal vessel containing a coolant material such as water, solid carbon dioxide or liquid nitrogen and located a short distance from the reaction zone, or the off-gas can be passed through a double-walled hollow cylinder with or without radial fins, cooled with circulating water.

The contact time, or residence time, of the mixed carbon fluorides and nitrogen oxides within the hot reaction zone should be sufficiently short to minimize side reactions resulting in decomposition of the nitrogen/fluorine compounds formed. While this contact time depends, in part at least, on the design of the apparatus and on the absolute pressure within the system, it can be said in general that it should not exceed ten seconds at the pyrolysis temperature. Preferably, the contact time is less than two seconds, and it can be as short as 0.001 second.

The absolute pressure of the reactant gas during the pyrolysis is not critical. Atmospheric pressure can be used. In general, however, because of the already discussed requirements of rapid quenching and short residence time, it is preferred to operate at reduced pressures, which can be as low as 1 mm. of mercury but are desirably in the range of 10–300 mm. of mercury. Reduced pressures are especially desirable when an electric arc is used as the source of heat, since the operation of the arc becomes more difficult with increase in pressure. With other types of reactors, such as, for example, externally heated tubular reactors, the absolute pressure is also preferably subatmospheric, for example, in the range of 10–300 mm. of mercury, but it can be atmospheric or even superatmospheric.

In the process of this invention, when the reaction is carried out in an electric arc, the reactants may be premixed, or added separately to the arc chamber, each with or without an inert carrier gas. The reactants may be passed in admixture through the arc or introduced in admixture or separately into the arc plasma downstream from the arc. In one variation of the process, one reactant, preferably the $CF_4$ or $COF_2$, may be injected upsteam from the arc, thus causing it to become preheated while traversing the arc, while the other reactant is injected into the arc plasma downstream from the arc, wherein the reactants are mixed in the hot zone and reaction takes place.

A preferred type of electric arc is a magnetically rotated arc. In comparison with static arcs, a rotating arc is far more efficient by virtue of its much greater stability and of the far better contact between arc and reactants that it permits. The electric arcs used in the examples which follow were of this kind.

A particularly efficient type of magnetically rotated arc operates as follows: The gas to be heated passes through a symmetrical annular gap formed by a substantially cylindrical solid cathode and a substantially cylindrical hollow anode, wherein a continuous electrical discharge is rotated by magnetic lines of flux essentially parallel to the axis of rotation of the annular arc. This causes the arc to move at right angle to the magnetic field lines. The magnetic field is created by surrounding the arc chamber with a coil through which a current (preferably a direct current) passes. A field strength suitable to cause rotation is 100–200 gauss. The arc rotates extremely rapidly in the annular gap between the electrodes, its speed being estimated at 1000–10,000 revolutions per second, and it heats the gas vey uniformly to extremely high temperatures as it passes through the gap. The heated gas leaves the arc chamber through the hollow anode.

The electrical characteristics of the rotating arc are essentially similar to those of the static arc. Thus, operating conditions of the arc may be varied over a wide range from the minimum voltage required to maintain the arc to high voltages, e.g., in the range of 10–75 volts or even much higher. In general, for a given current the required voltage of the arc is determined by the pressure in the system, the width of the arc gap, and the nature of the gas present in the arc chamber. The power requirements will, of course, depend on the quantity of gas passed through the rotating arc and the temperature to which it is to be heated.

The arc may be operated with a direct current or with an alternating current if the alternating current is of high frequency and is employed in combination with an alternating magnetic field which is in phase with the arc current. A direct current is greatly preferred, since only with a direct current is it possible to obtain a truly continuous rotating arc resulting in uniform heating and high stability. Current intensities in the range of 20 to 700 amperes are generally used.

The gaseous reaction product coming from the hot zone is first quenched rapidly to below about 100° C., as already mentioned. Conveniently, the reaction product after quenching is collected in a gas chamber, such as is used for collecting samples for gas analysis, or passed through a system of traps cooled either in a slurry of solid carbon dioxide in a liquid such as acetone or in liquid nitrogen where the reaction products together with unreacted starting materials are liquefied and collected while all or nearly all of the more volatile gases such as nitrogen or other inert carrier gases may escape.

The collected products may be used without purification, or may be purified by well known means such as fractional distillation or by gas chromatography. Unreacted carbon tetrafluoride, carbonyl fluoride or oxides of nitrogen may be separated and recycled.

The following examples are given to illustrate the invention in greater detail. A magnetically-rotated electric arc of the type referred to above was used. The cathode was a graphite rod of $3/16''$ diameter, the anode was a short hollow graphite cylinder mounted in a water-cooled copper holder. The external diameter of the anode was $5/8''$ and the internal diameter ranged from $1/8''$ to $1/2''$ for the various experiments. The anode was also constructed with a ring-shaped constriction near the entrance to establish the location of the arc column and it was perforated to permit the introduction of reactants (oxides of nitrogen) into the post arc region within the hollow anode. With proper operation of the equipment with respect to voltage, amperage and pressure, more fully described in the following experiments, neither electrode changed weight significantly during the various experiments.

*Example I*

The source of heat was the magnetically rotated electric arc described above wherein the internal diameter (bore) of the anode was $1/2''$. The arc was operated at 44 volts and 34 amperes.

A gaseous mixture containing carbon tetrafluoride diluted with approximately three volumes of nitrogen was passed through the arc at a rate of about 540 ml./min. (calculated at standard pressure and temperature) at an operating pressure of 78 mm. The gas stream was heated to a temperature upwards of 2000° C. and left the arc zone through the hollow anode. Nitric oxide, flowing at the rate of 150 ml./min. (S.T.P.) was injected from outside the anode through the perforations into the incandescent gas stream from the arc at a region approximately $1/4''$ downstream from the rotating arc flame. The product gases were then quenched very quickly to below about 100° C. by impinging on the outer surface of a copper vessel filled with liquid nitrogen and located about $3/4''$ downstream from the arc zone. The cooled gaseous product was then led to a trap cooled with liquid nitrogen where the condensable portions were collected.

That portion of the condensed product which was volatile at −90° C. was analyzed by mass spectrometry. It was found to contain as the principal products, in addition to unchanged carbon tetrafluoride, nitrogen trifluoride, carbonyl fluoride, and silicon tetrafluoride. The silicon tetrafluoride was probably produced by the action of initially formed nitrosyl fluoride on the glass portions of the traps and collecting equipment.

*Example II*

Carbonyl fluoride, flowing at a rate of about 230 ml./min. (calculated at standard pressure and temperature) at a pressure of 28 mm., was passed through a magnetically rotated electric arc of the type described above, wherein the bore of the hollow anode was $5/16''$ and the arc was operated at 54 volts and 42 amperes. A small amount of nitrogen, about 20–30% by volume, was added to aid regulation of pressure and flowrate in the system. The gas stream left the arc zone through the hollow anode. Nitric oxide, flowing at the rate of 140 ml./min. (S.T.P.) was injected into the incandescent gas stream from the arc at a region approximately $1/4''$ downstream from the rotating arc flame. The product gases were then quenched and collected as in Example I.

The condensable product prepared from 12.4 parts of carbonyl fluoride used as starting material was allowed to evaporate slowly through a tube containing excess silicon tetrafluoride, and 4.2 parts of a white, nonvolatile solid was obtained with evolution of heat. This proved on analysis to be the known salt formed from nitrosyl fluoride and silicon tetrafluoride, $(NOF)_2SiF_4$, thus establishing the presence of nitrosyl fluoride in the product. Mass spectrometric analysis of the portion of product volatile at −78° C. showed the presence of nitrogen trifluoride and dinitrogen difluoride in a molar ratio greater than 3:1. Other products were unchanged $CF_4$, $COF_2$, $CO_2$, $N_2O$ and $NO$.

Example III

Carbon tetrafluoride was passed through an electric arc of the type described above, wherein the bore of the anode was 1/8" and the arc operated at 43 volts and 50 amperes at a rate of about 280 ml./min. (calculated at standard pressure and temperature) at a pressure of 46 mm. Nitrogen, about 40% by volume, was added to aid regulation of pressure and to increase the flowrate in the system. The gas stream was heated and left the arc zone through the hollow anode. Nitric oxide, flowing at the rate of 220 ml./min. (S.T.P.) was injected into the incandescent gas stream from the arc at a region approximately 3/8" downstream from the rotating arc flame. The product gases were then quenched and collected as in Example I.

A sample of the product stream issuing from the arc reactor before condensation was analyzed with a mass spectrometer and found to contain 2.5 mole percent of nitrogen trifluoride, 39 mole percent of carbon tetrafluoride, 8 mole percent of carbon dioxide, 5 mole percent of nitrous oxide, 26 mole percent of nitrogen, 12 mole percent of nitric oxide and 7 mole percent of silicon tetrafluoride. The latter probably arose from action of a reactive fluorine product such as nitrosyl fluoride, on glass bulbs used to store the mixture prior to analysis. The condensable product volatile at −78° C. contained 3 mole percent of nitrogen trifluoride, 83 mole percent of carbon tetrafluoride, 7 mole percent of nitric oxide and 4 mole percent of nitrous oxide, together with small amounts of carbonyl fluoride. Twenty-one parts by weight of this condensable product volatile at −78° C. was obtained from 25 parts of carbon tetrafluoride. The yield of nitrogen trifluoride based on the carbon tetrafluoride consumed was 8.9%.

Example IV

Carbon tetrafluoride was passed through a magnetically rotated electric arc of the type described above having an anode of 1/8" internal diameter and operated at 45 volts and 39 amperes at a rate of about 250 ml./min. (calculated at standard pressure and temperature) at an operating pressure of 56 mm. About 1.5 volumes of nitrogen was added to aid regulation of pressure and to increase flowrate in the system. The gas stream left the arc zone through the hollow anode. Nitrous oxide, flowing at the rate of 190 ml./min. (S.T.P.) was injected through the perforations of the anode into the incandescent gas stream from the arc at a region approximately 1/4" downstream from the rotating arc flame. The product gases were then quenched and collected as in Example I.

Mass spectrographic analysis of a sample of the product stream from the arc reactor indicated its composition to be as follows: carbon tetrafluoride, 25 mole percent; carbonyl fluoride, 3 mole percent; nitrous oxide, 15 mole percent; nitrogen, 52 mole percent; nitrogen trifluoride, 1.3 mole percent; nitric oxide, silicon tetrafluoride, 1–2 mole percent each. The condensable product comprised 90% carbon tetrafluoride and nitrous oxide, the starting materials, but also contained 1.4% of nitrogen trifluoride. The yield of $NF_3$ was approximately 4%, based on unrecovered $CF_4$.

Example V

Carbonyl fluoride and nitric oxide were reacted as in Example II except the bore of the anode was 1/8" and the nitric oxide was injected into the incandescent gas stream from the arc at a region approximately 1/2" downstream from the rotating arc flame.

Mass spectrographic analysis indicated the condensable product, expressed in mole percent, to contain nearly 50 mole percent unchanged carbonyl fluoride, together with 34% carbon tetrafluoride, 5% carbon dioxide, 3% nitrous oxide and nitric oxide and about 1% each of nitrogen trifluoride and dinitrogen difluoride. The presence of the latter compound was further confirmed by separation of both its cis and trans isomers from the other product components by gas chromatography.

Example VI

A gaseous mixture of carbon tetrafluoride and nitric oxide in a molar ratio of 1.36:1 was passed through a rotating arc at a rate of about 665 ml./min. (calculated at standard pressure and temperature) at an operating pressure of 65 mm. Both electrodes were of graphite, but the anode, a cylinder with an internal diameter of 0.5", was encased in a water-cooled copper holder and kept cool; and the cathode, a 3/16" diameter rod, was shielded with a cooled copper shield filled with nitrogen which minimized contact of the electrode with the reactants. Both electrodes suffered very little attrition during the operating period. The arc was operated at 55–59 volts and 35 amperes. After traversing the arc, the gases were quenched rapidly by impingement on a liquid-nitrogen cooled, copper surface located about 0.5" downstream.

The condensable product, collected in a trap cooled with liquid nitrogen contained, in addition to about 58 mole percent of unchanged carbon tetrafluoride, 38 mole percent of carbonyl fluoride and 1.7 mole percent of nitrogen trifluoride and smaller amounts of several other products.

As a comparison, the following experiment shows that, when participating (i.e., carbon-supplying) electrodes are used, no nitrogen-fluorine compounds are obtained.

A gaseous mixture of carbon tetrafluoride and nitric oxide in a molar ratio of 0.4:1 was passed through a rotating arc at a rate of about 295 ml./min. (calculated at standard pressure and temperature) at an operating pressure of 35 mm. Both electrodes were of graphite, the anode being a hollow perforated cylinder with an internal diameter of 0.5" and the cathode was a rod 3/16" in diameter. Neither electrode was cooled and graphite was consumed during the operating period at a molar rate corresponding to 20% of the molar feed rate of the gaseous mixture. The arc was operated at 54 volts and 34 amperes. After traversing the arc, the product gases were quenched rapidly by impinging on a liquid-nitrogen cooled, copper surface located about 1" downstream.

The condensable product, collected in a trap cooled with liquid nitrogen contained, in addition to about 55 mole percent of unchanged carbon tetrafluoride, 20 mole percent of tetrafluoroethylene, 11 mole percent of hexafluoroethane, 10 mole percent of cyanogen fluoride and smaller amounts of several other products, but no nitrogen fluorides or oxyfluorides were detectable either by gas chromatographic or mass spectrometric analyses.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. Process for the preparation of inorganic nitrogen/fluorine compounds which comprises passing a nitrogen oxide and a fluoride of the group consisting of carbon tetrafluoride and carbonyl fluoride through a reaction zone of at least 1000° C. in the substantial absence of any other reactive substance and with a contact time within said zone not exceeding 10 seconds, rapidly cooling the gaseous reaction products and obtaining at least one member of the group consisting of nitrogen trifluoride, dinitrogen difluoride and nitrosyl fluoride.

2. Process for the preparation of inorganic nitrogen/fluorine compounds which comprises injecting upstream from an electric arc a fluoride of the group consisting of carbon tetrafluoride and carbonyl fluoride, said fluoride becoming preheated while traversing the arc, injecting a nitrogen oxide into the arc plasma downstream from the arc flame, whereupon the fluoride and oxide are mixed in the hot zone maintaining said fluoride and oxide in contact in said zone for a period not exceeding 10 seconds, and rapidly cooling the resulting gaseous products to obtain at least one member of the group consisting of nitrogen trifluoride, dinitrogen difluoride and nitrosyl fluoride.

3. The process as set forth in claim 1 wherein nitrogen trifluoride is obtained as a product.

No references cited.